Patented May 15, 1923.

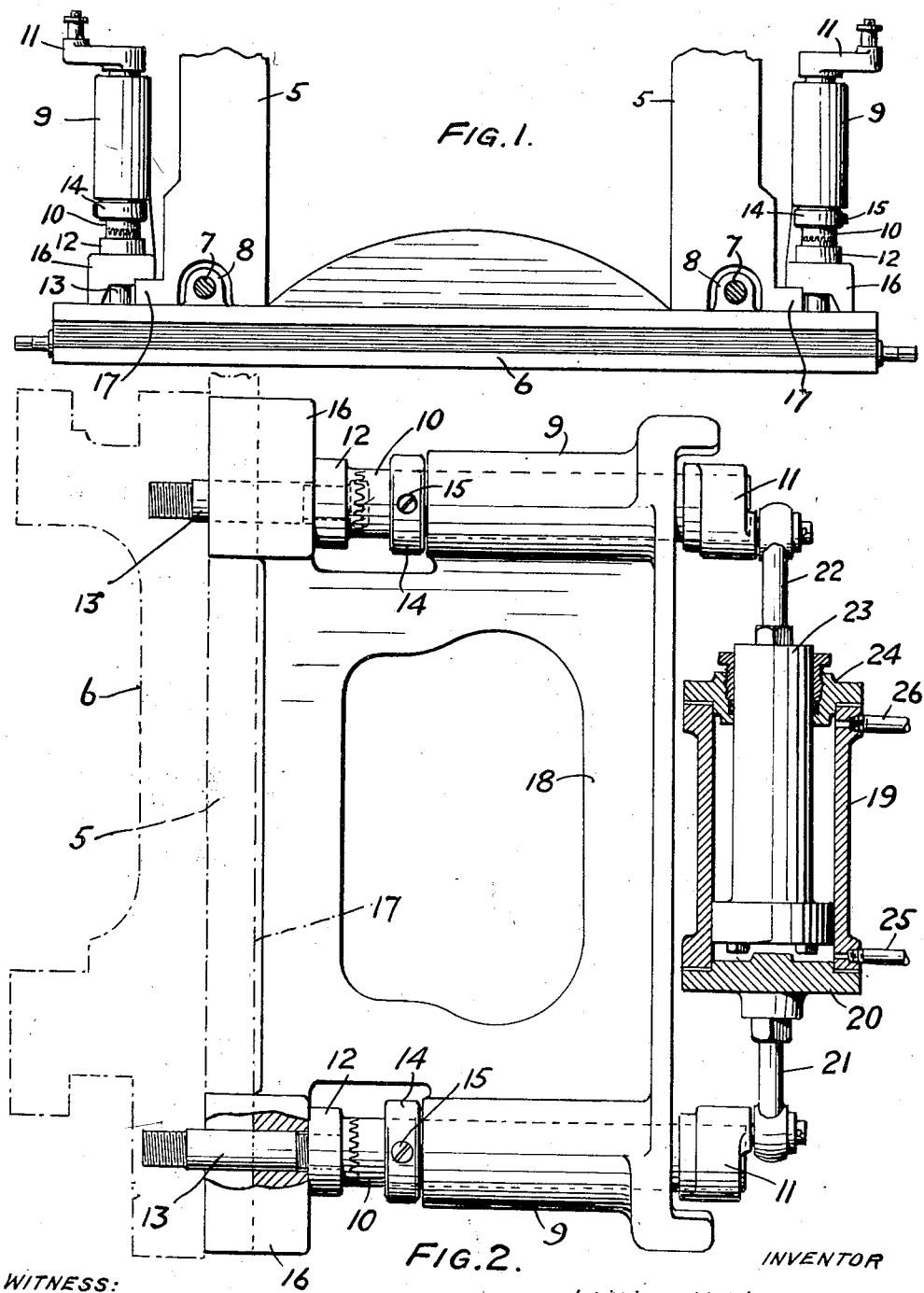

1,455,556

UNITED STATES PATENT OFFICE.

WILLIAM H. THORNE, OF PHILADELPHIA, PENNSYLVANIA, ASSIGNOR TO WILLIAM SELLERS AND COMPANY, INCORPORATED, OF PHILADELPHIA, PENNSYLVANIA, A CORPORATION OF PENNSYLVANIA.

CLAMPING MECHANISM FOR MACHINE TOOLS.

Application filed July 20, 1921. Serial No. 486,229.

*To all whom it may concern:*

Be it known that I, WILLIAM H. THORNE, a citizen of the United States, residing at Philadelphia, county of Philadelphia, and State of Pennsylvania, have invented a new and useful Improvement in Clamping Mechanism for Machine Tools, of which the following is a full, clear, and exact description, reference being had to the accompanying drawings, which form a part of this specification.

This invention relates to an improvement in clamp actuating mechanism for tool supports for machine tools, such as shown in the patent to George H. Benzon, Jr., No. 904,922, dated November 24, 1908, and is designed to provide simple and effective mechanism of this character which can readily be adjusted when first applying the device, as well as for adjusting to compensate for wear.

Fig. 1 is a plan view of a cross-rail and guides of a planer in which I have shown one form of my improvement for clamping the cross-rail to its guides.

Fig. 2 is an end view on a larger scale.

In Fig. 1 of the drawings, the reference character 5 designates guides for the cross-rail 6 for supporting the usual tool head, not shown. The cross-rail is raised and lowered in the usual manner by screw shafts 7, which engage threaded lugs 8 connected to the cross-rail. Connected to the cross-rail 6 on each end thereof, one above the other, are two bearings 9, only one being shown on each end. Turnably mounted in each bearing is a shaft 10. Connected to each shaft at one end thereof is a crank 11, while the other ends of the shafts are provided with teeth which engage similar teeth in one face of a nut 12. The nuts 12 engage threaded portions of screws 13 which are threaded into openings in the cross-rail and are fixed relative thereto. Mounted on each of the shafts 10 is a collar 14, provided with a set screw 15 for securing the collar in position on the shaft, and which collar retains clutch teeth in engagement with each other to rotate the nut when the shaft is rotated.

16 are clamping members, there being one on each screw, between the nut 12, the cross-rail 6, and a flange 17, on the guide 5, and which are arranged to clamp the cross-rail in position on the guides when the nuts 12 are jammed against the members 16 by the rotation in one direction of the cranks 11, and to free the cross-rail when the cranks are rotated in the other direction. These cranks are oscillated by mechanism similar to that shown in the above mentioned patent or that shown in Fig. 2.

The two bearings 9 on each side of the machine and the two clamping members 16 are connected to a frame member or support 18, which is connected to the cross-rail 6 by the screws 13. The inner end of each shaft 10 is recessed as indicated in dotted lines on the upper portion of Fig. 2 for the reception of the nut end of screw 13, if the screws should be of sufficient length to project beyond their nuts 12.

In assembling the parts, the screws 13 are seated in the cross-rail, and the bearings are secured in position, in alignment with the screws. The clamping members 16 and nuts 12 are then positioned and the nuts may be drawn home to clamp the parts in position. The shafts 10 are then inserted through the bearings 9 and their respective collars 14. The teeth on the ends of the shafts are engaged with the teeth on their respective nuts in such a manner that each crank will be placed at its best workable angle. The collars 14 are then secured in position to the shafts. The crank actuating mechanism is then connected to the cranks and coupled up to a suitable source of pressure supply.

19 designates a cylinder having a head 20 which is connected to the crank 11 on the lower shaft 10 by means of a connecting rod 21. 22 is a connecting rod connected to the piston 23 in the cylinder 19, and 24 is a stuffing box in the cylinder head to form a tight joint between a reduced portion on the piston and the upper cylinder head. 25 and 26 are connections to the bottom and top of the cylinder for controlling the admission of pressure to and exhaust from the cylinder above and below the piston.

In order to actuate the clamps, pressure is admitted through pipe 25 and the pipe 26 is opened to exhaust, which will move the piston upward and the cylinder downward and cause the nuts 12 to exert pressure on the members 16. When it is desired to release the clamps, pressure is admitted through pipe 26 and the pipe 25 is opened to exhaust to cause the reverse movement of the piston and cylinder and consequently the reverse movement of the nuts to free the members 12.

The advantages of my invention result from the provision of a crank actuated screw clamp for clamping a tool support for a machine tool to its supporting guide, in which the crank and one of the screw members are connected to each other in such a manner that they can readily be adjusted with relation to each other to place the crank in its best working position with relation to its actuating mechanism for applying and releasing the clamp.

Having now fully described my invention, what I claim and desire to protect by Letters Patent is:—

1. The combination with a tool support of a machine tool and its guide, of a clamp for securing the support to the guide, screw and nut members for actuating the clamp, a rock shaft connected to one of said members and arranged to move about the axis of the screw and nut members, an actuating crank connected to the shaft, and actuating connections connected to the crank, the connection between the shaft and the screw member being such that said members can be adjusted circumferentially with relation to each other to place the crank in its best working position with relation to its actuating mechanism.

2. A clamping device of the character described comprising a fixed screw, a movable clamping member on the screw, a nut on the screw for engaging the clamping member, a rock shaft in axial alignment with the screw, a bearing for said shaft, a crank on the shaft, interconnecting driving teeth on the end of the shaft and the nut arranged to permit circumferential adjustment of the shaft and the nut, and removable means on the shaft for retaining the teeth in engagement with each other.

3. A clamping device of the character described comprising a fixed screw, a movable clamping member on the screw, a nut on the screw for engaging the clamping member, a rock shaft in axial alignment with the screw, a bearing for said shaft, a crank on said shaft at one end of the bearing arranged to prevent endwise movement of the shaft in one direction, annularly arranged interconnecting teeth on the other end of the shaft and one face of the nut, said teeth being arranged to permit the shaft to be adjusted circumferentially with relation to the nut, and a collar secured to the shaft at the end of the bearing opposite the crank to prevent endwise movement of the shaft in the other direction when the collar is secured thereto.

In testimony of which invention, I have hereunto set my hand, at Philadelphia, Pa., on this 18th day of July, 1921.

WILLIAM H. THORNE.